US012572395B2

(12) United States Patent
Lambrecht

(10) Patent No.: US 12,572,395 B2
(45) Date of Patent: Mar. 10, 2026

(54) METHOD AND DEVICES FOR LATENCY COMPENSATION

(71) Applicant: GESTALT Robotics GmbH, Berlin (DE)

(72) Inventor: Jens Lambrecht, Berlin (DE)

(73) Assignee: Gestalt Automation GmbH, Berlin (DE)

( * ) Notice: Subject to any disclaimer, the term of this patent is extended or adjusted under 35 U.S.C. 154(b) by 1030 days.

(21) Appl. No.: 17/331,136

(22) Filed: May 26, 2021

(65) Prior Publication Data

US 2021/0374573 A1      Dec. 2, 2021

(30) Foreign Application Priority Data

May 27, 2020      (EP) ..................................... 20176760

(51) Int. Cl.
*G05B 13/04* (2006.01)
*G06F 9/54* (2006.01)
*G06N 5/04* (2023.01)
*H04L 67/125* (2022.01)

(52) U.S. Cl.
CPC ............. *G06F 9/54* (2013.01); *G05B 13/048* (2013.01); *G06N 5/04* (2013.01); *H04L 67/125* (2013.01)

(58) Field of Classification Search
CPC ........ G06N 5/04; G05B 13/048; H04L 67/01; H04L 67/125; G06F 9/5072; G06F 2209/541; G06F 9/54
See application file for complete search history.

(56) References Cited

U.S. PATENT DOCUMENTS

| | | | |
|---|---|---|---|
| 2011/0066262 A1* | 3/2011 | Kelly ................. | G05B 23/0267 |
| | | | 703/17 |
| 2012/0197464 A1 | 8/2012 | Wang et al. | |
| 2016/0351056 A1 | 12/2016 | Herbach et al. | |
| 2016/0371585 A1* | 12/2016 | McElhinney ............. | G06F 9/46 |
| 2017/0123429 A1* | 5/2017 | Levinson ............. | B60W 50/00 |
| 2017/0233071 A1 | 8/2017 | Pilskalns et al. | |
| 2018/0088576 A1* | 3/2018 | Kong ..................... | B60W 30/16 |
| 2019/0118829 A1* | 4/2019 | Goldberg ............ | B60W 60/001 |

(Continued)

FOREIGN PATENT DOCUMENTS

| | | |
|---|---|---|
| EP | 2214067 | 8/2010 |
| WO | WO2019052665 | 3/2019 |

OTHER PUBLICATIONS

European Search Report for related European Patent Application No. EP20176760.5 dated Oct. 23, 2020.

(Continued)

*Primary Examiner* — Reji Kartholy
(74) *Attorney, Agent, or Firm* — Caesar Rivise, PC

(57) ABSTRACT

The invention relates, amongst other things, to a method for operating a client device. If a first operation command is not received from a server device within a predetermined period of time in response to sending at least one first sensor signal, one of a plurality of predictions is selected depending on at least one first sensor signal and/or at least one currently detected sensor signal and a plurality of sensor signal hypotheses and the client device is operated with at least one operation command hypothesis of the selected prediction. The invention also relates, amongst other things, to a method for operating a server device.

22 Claims, 3 Drawing Sheets

10

(56)                    References Cited

U.S. PATENT DOCUMENTS

| | | | |
|---|---|---|---|
| 2019/0369616 A1* | 12/2019 | Ostafew | G08G 1/0112 |
| 2020/0189100 A1* | 6/2020 | Rácz | G05B 19/4103 |
| 2020/0310420 A1* | 10/2020 | Scorcioni | G06N 3/006 |
| 2021/0078570 A1* | 3/2021 | Shalev-Shwartz | B60W 10/18 |
| 2021/0300440 A1* | 9/2021 | Sindhuja | G06V 20/54 |
| 2023/0072244 A1* | 3/2023 | Wakayama | G05B 19/4182 |

OTHER PUBLICATIONS

Lupashin et al., "A Platform for Aerial Robotics Research and Demonstration: The Flying Machine Arena", Mechatronics, vol. 24, Issue 1, pp. 41-54 (2014).

* cited by examiner

METHOD AND DEVICES FOR LATENCY COMPENSATION

CROSS-REFERENCE TO RELATED APPLICATIONS

This non-provisional application claims the benefit under 35 U.S.C. § 119(a) of European Patent Application No. 20176760.5 filed on May 27, 2020 entitled "Method and Devices for Latency Compensation", and whose entire disclosure is incorporated by reference herein.

TECHNICAL FIELD

The present disclosure relates to a method for operating a client device for latency compensation, a method for operating a server device for latency compensation and a device, preferably a client device or a server device.

BACKGROUND

Cloud computing and edge computing make it possible to use external computing power flexibly and in a scalable and service-oriented manner. This is also increasingly interesting for computer-based control of mobile or stationary machines or display devices, since they are otherwise subject to the restrictions of the locally installed computing infrastructure (on-premises or local calculations generally via industrial PC or embedded hardware).

The use of external computing resources by outsourcing software functions can bring various advantages owing to the theoretically infinite computing power. For example, it is possible to calculate powerful and elaborate AI algorithms and to calculate various functions in parallel at the same time. A higher availability of mobile devices or machines, for example mobile transport systems (AGVs), AR/VR glasses, can be achieved by outsourcing computing power. The requirements for the local hardware of the machines are lower. Alongside the life cycle of the devices/software, various advantages can also be realised, such as, for example, a simpler start-up, updates on the fly, seamless integration of M2M communication and value-added services, easy sharing of knowledge and information, transparency and enabling new business models (for example pay-per-use) through monitoring services, seamlessly switching between simulation and real devices in the software development, etc.

The outsourcing of algorithms for controlling machines is an intensive subject of research (for example in the field of cloud robotics) and is of great relevance especially in the field of intelligent adaptive systems such as robots and autonomous driving. However, in particular in the industrial sector, the basic requirement for outsourcing software services or the use of external software services is the robust and reliable communication between machines and external (virtualised) resources. Accordingly, the challenges for communication technology are increasing, especially in the case of software functions which have soft or hard real-time requirements (for example control for adapting movements). It is problematic that, in comparison to industrial bus systems, the connection to the edge/cloud as a rule are usually realised via TCP/IP-based connections. These TCP/IP-based connections do not support the real-time capability and deterministic behaviour. Latencies may therefore vary due to congestion/overload and adapting the data routes (flow control). It is therefore possible, for example, that response times to the cloud on average correspond to the requirements of a real-time critical software service but in practice there are unpredictable variations of individual latencies. These latencies can either negatively influence the performance of the requirement or in case of doubt can result in a complete failure of the application. These effects are found to be intensified when using mobile networks, in particular WLAN, for which there is no quality of service, for example. Modern mobile networks, such as 4G and 5G campus networks, promise solutions through the use of additional frequency bands, network virtualisation, adapted protocols and redundancies. This can result in a reduction of latencies and a quality of service. However, in practice, these new wireless networks are locally susceptible to interference and electromagnetic fields which can emanate from machines, for example, such that latencies may vary (greatly) locally, especially in industrial environments. For example, packages may go missing or arrive too late. This fact is particularly relevant for mobile devices (mobile robots, transport systems, AR-VR smart glasses) and thus so far prevents the outsourcing of real-time relevant software functions.

WO 2019/052665 A1 discloses a technique for providing reliable control of a robot in a cloud robotics system. If it has been identified that a command for controlling the robot is missing as a result of a delay or a loss of the command in a communication path between the robot and a robot control, a substitution command is generated which corresponds to an expected command of the missing command. The substitution command is sent to the robot.

EP 2 214 067 A1 discloses a network control system which uses measures for latency compensation.

The underlying object of the invention is to create an alternative and/or improved technique for latency compensation, preferably in the case of controlling a client device by means of a server device.

SUMMARY OF THE INVENTION

The object is achieved by the features of the independent claims. Advantageous developments are specified in the dependent claims and the description.

One aspect of the present disclosure relates to a method for operating a (e.g. mobile or stationary) client device, preferably a robot, a vehicle or a terminal, for latency compensation. The method includes receiving a plurality of (e.g. initial) predictions, which each have at least one (e.g. compressed/coded or uncompressed) sensor signal hypothesis and at least one (e.g. compressed/coded or uncompressed) operation command hypothesis, from a server device (for example by means of a communication interface of the client device). The method includes detecting at least one first sensor signal (for example by means of a sensor system or a user input device of the client device). The method includes sending the at least one first sensor signal to the server device (for example by means of a communication interface of the client device). The method includes waiting for a predetermined period of time. The method includes operating the client device with the at least one first operation command (for example after the predetermined period of time has expired and/or by means of an actuator system or a user output device of the client device), if at least one first operation command is received from the server device within the predetermined period of time in response to sending the at least one first sensor signal (for example by means of a communication interface of the client device). The method includes selecting one of the plurality of predictions depending on the at least one first sensor signal and/or at least one currently detected sensor signal and the plurality of sensor signal hypotheses (for example by means of a hypothesis allocator of the client device) and operating the client device with the at least one operation command hypothesis of the selected prediction (for example after the predetermined period of time has expired and/or by means of an actuator system or a user output device of the client device), if a first operation command is not received from the server device within the predetermined period of time in response to sending the at least one first sensor signal (for example by means of a communication interface of the client device).

The method can advantageously be applied if the normal network latencies are in principle sufficient for the requirements for operating the client device but there are local and also temporally selective increases in the latencies caused by the network. The method can also advantageously be used for seamless bridging of delays which occur in order to shift a virtualised cloud control from one instance to another instance during operation. The shift can include a switch of the cloud server or a switch from cloud to edge, for example, since latencies in the core network/public network become too high, for example. The shift can also include a switch of a network infrastructure from WLAN to 5G/4G (or vice versa) or from WLAN to WLAN.

Latencies caused by the network or not caused by the network would conventionally result in a negative influence on the operation of the client device (for example stalled movements, inefficient operation, etc.). The method can advantageously at least temporarily compensate for these negative influences. It is possible to fall back on previously received predictions if operation commands are not received in time from the server device. In this case, the most accurate prediction can be achieved by aligning the sensor signal hypotheses with a current sensor signal. The method can enable a temporary resolution of the conflict between real-time requirements of the client device and occurring latency variations. The method can also enable a comparatively cost-effective and less complex configuration of the client device. Computationally intensive method steps can be outsourced to the server device in a secure and real-time capable manner, without temporarily increased latencies being able to influence the operation of the client device in a substantially negative manner. The local computational effort on the client device can be reduced to a minimum. For example, software nodes for a sensor system and actuator system may remain on the client device, while the complete control architecture (for example local and global path planning, SLAM, AI, modelling, etc.) can be outsourced to the server device. Externally, very high levels of computing power and scaling possibilities (e.g. simulation) may available on the server device (e.g. edge or cloud server device). The method can particularly preferably be applied in the case of operating mobile robots/transport systems for indoor and outdoor applications via the cloud/edge. The method can also advantageously be applied in the case of autonomous vehicles, in particular at high speeds, and in the case of user interaction processes (for example cloud computing or an augmented reality device in connection with cloud computing for outsourcing functions for the environmental perception). The method can also be applied in the case of using non-real-time capable ROS (robot operating system) middleware as a quasi-industry standard, for example. In principle, the method may be suitable for all possible types of time-critical closed loop control via external infrastructures, preferably for realizing sensor-based control loops via cloud computing and edge computing.

It is understood that the method functions in combination with (conventional) model predictive or model-based control (for example autonomous navigation with a status estimator, model, etc.) and can complement it in a useful manner, if desired.

It is possible that the predictions, the sensor signal hypothesis and/or the at least one operation command hypothesis are decompressed or decoded prior to reception. Alternatively, selection can take place depending on the plurality of compressed or coded sensor signal hypotheses, for example, and/or operation can take place with the at least one compressed or coded operation command hypothesis of the selected prediction.

The method steps (receiving the plurality of predictions, detecting the at least one first sensor signal, sending the at least one first sensor signal, waiting for a predetermined period of time, etc.) can preferably be carried out by one individual client device. However, it is also possible that a plurality of client devices are present which divide the method steps (receiving the plurality of predictions, detecting the at least one first sensor signal, sending the at least one first sensor signal, waiting for a predetermined period of time, etc.) amongst themselves in a suitable manner. For example, a first client device (e.g. sensor node client device) and a second client device (e.g. command acceptance node client device) could be present which are in communication connection with one another. The first client device could, for example, detect the first sensor signal (and all further sensor signals, for example) by means of a sensor system or a user input device of the first client device. The second client device could be the client device which is to be operated. The first sensor signal could preferably be sent from the client device directly to the server service or to the second client device for sending to the server device. The first client device and/or the second client device could receive the first operation command and/or the plurality of predictions. The first client device or the second client device could carry out the waiting and/or the selection. The client devices could send any result of a method step to the respective other client device (for example sending the at least one operation command hypothesis of the selected prediction from the first client device to the second client device).

In one exemplary embodiment, the method further includes detecting at least one initial sensor signal before detecting the at least one first sensor signal, preferably at least one time step or operating cycle before detecting the at least one first sensor signal (for example by means of a sensor system or a user input device of the client device). The method can further include sending the at least one initial sensor signal to the server device (for example by means of a communication interface of the client device). Receiving the plurality of predictions can preferably take place in response to sending the at least one initial sensor signal. This makes it possible for even the initial predictions to be comparatively accurate, since they are based on at least one initial sensor signal.

In one development, the method includes receiving at least one initial operation command from the server device in response to sending the at least one initial sensor signal, preferably together with receiving the plurality of predictions (for example by means of a communication interface of the client device). The method can preferably further include operating the client device with the at least one initial operation command (for example by means of an actuator system or user output device of the client device), preferably during the predetermined period of time, until the next operating cycle, until operating the client device with the at least one first operation command or until operating the client device with the at least one operation command hypothesis of the selected prediction. This advantageously enables the initial sensor signal to also be able to be used directly for creating an operation command on the server side.

In one further exemplary embodiment, that prediction (for example by means of a hypothesis allocator of the client device) is selected whose at least one sensor signal hypothesis corresponds to the at least one first sensor signal or differs the least from the at least one first sensor signal (for example difference method, pixel comparison, nearest neighbour heuristic, difference calculation, look-up tables (conversion tables) or allocating the appropriate hypothesis via artificial neural networks or other AI models, etc.). This advantageously makes it possible to minimise the calculation on the side of the client device through a minimum alignment of actual sensor signals and sensor signal hypotheses. An AI model may also be used which is designed to identify differences in sensor signals.

In one further exemplary embodiment, the method further includes sending a model correction based on the at least one operation command hypothesis of the selected prediction to the server device (for example by means of a communication interface of the client device). This preferably enables the server-side status image of the client device to be able to be updated.

It is also possible that the server-side status model or the implementation of model-predictive control (with status estimation/state estimation) on the server side can of course adapt the current status optionally even without client-side model correction, despite temporary loss of communication. In this case, it would not be necessary to explicitly retransmit the model correction to the server device. Instead, an automatic adaptation could take place on the server side.

In one exemplary embodiment, the method further includes receiving a plurality of further predictions, which each have at least one sensor signal hypothesis and at least one operation command hypothesis, from the server device (for example by means of a communication interface of the client device), preferably in response to sending the at least one initial sensor signal and/or together with receiving the plurality of predictions. The method can further include detecting at least one second sensor signal after detecting the at least one first sensor signal, preferably an operating cycle after detecting the at least one first sensor signal (for example by means of a sensor system or a user input device of the client device). The method can include sending the at least one second sensor signal to the server device (for example by means of a communication interface of the client device). The method can include waiting for a further predetermined period of time. The method can include operating the client device with at least one second operation command (for example by means of an actuator system or a user output device of the client device), if the at least one second operation command is received from the server device within the further predetermined period of time in response to sending the at least one second sensor signal (for example by means of a communication interface of the client device). The method can include selecting one of the plurality of further predictions depending on the at least one second sensor signal and/or at least one currently detected (further) sensor signal and the plurality of sensor signal hypotheses of the plurality of further predictions (for example by means of a hypothesis allocator of the client device) and operating the client device with the at least one operation command hypothesis of the selected prediction of the plurality of further predictions (for example by means of an actuator system or a user output device of the client device), if a second operation command is not received from the server device within the further predetermined period of time in response to sending the at least one second sensor signal (for example by means of a communication interface of the client device). The method can therefore preferably make it possible to not only receive predictions for the next time step but rather also for at least one subsequent time step. The method can therefore enable a real-time capability of the client device even in the case of very high latencies.

The method can optionally include sending a further model correction based on the at least one operation command hypothesis of the selected prediction of the plurality of further predictions to the server device (for example by means of a communication interface of the server device).

In one embodiment variant, the at least one first sensor signal (and/or the at least one initial sensor signal and/or the at least one second sensor signal) is detected by an internal sensor system, an environment sensing system and/or a user input device of the client device. The method can therefore be applied to a multiplicity of possible sensor signals.

In one further embodiment variant, at least one actuator (e.g. a steering actuator, a drive and/or a valve) and/or a user output device (e.g. a display device and/or a loudspeaker) of the client device is operated by means of the at least one first operation command. The method can therefore be applied to a multiplicity of different fields of application.

On further aspect of the present disclosure relates to a method for operating a server device (for example a local server device, edge server device or cloud server device) for latency compensation. The method includes creating (for example in a rule-based, experience-based, model-based and/or random manner) a plurality of system state hypotheses with respect to predictive system states (for example for one or a plurality of future time steps) of a client device based on a, preferably current, status image of the client device (for example created by means of status modeller of the server device) and preferably an environmental model of the client device (for example by means of a hypothesis creator of the server device). The method further includes creating a plurality of predictions, which each have at least one sensor signal hypothesis (for example created by means of a hypothesis creator of the server device and/or by means of a simulation environment of the server device) and at least one operation command hypothesis (for example created by means of an operation command creator of the server device), based on the plurality of system state hypotheses. The method further includes sending the plurality of predictions to the client device (for example by means of a communication interface of the server device). The method can preferably achieve the same advantages as already disclosed herein for the method for operating the client device.

It is possible that the predictions, the sensor signal hypotheses and/or the operation command hypotheses are compressed or coded prior to sending.

In one exemplary embodiment, the method further includes receiving at least one initial sensor signal from the client device (for example by means of a communication interface of the server device). Creating the status image and/or the plurality of system state hypotheses can additionally be based on the at least one initial sensor signal.

In one further exemplary embodiment, the method includes creating at least one initial operation command based on the status image and/or the at least one initial sensor signal (for example by means of an operation command creator of the server device) and sending the at least one initial operation command to the client device, preferably together with the plurality of predictions (for example by means of a communication interface of the server device).

In one embodiment, the sensor signal hypotheses are derived from the plurality of system state hypotheses and preferably an environmental model of the client device.

In one further embodiment, the sensor signal hypotheses are derived from the plurality of system state hypotheses by means of a, preferably graphical, simulation environment of the server device. This can make it possible for complex sensor signal hypotheses to also be able to be synthetically created, for example 2D or 3D image data.

In one further embodiment, the sensor signal hypotheses can be adapted or be adaptable (for example by means of a post-processor of the server device) by adding a disturbance variable, preferably noise, by rendering (e.g. image synthesis) and/or by means of machine learning, preferably by way of generative adversarial networks. A realism of the synthetic sensor signal hypotheses can thereby be increased, so that the sensor signal hypotheses approximate the actual sensor signals. This advantageously makes it possible to improve a client-side alignment between the sensor signal hypotheses and current sensor signals.

In one embodiment variant, the operation command hypotheses are generated based on the system state hypotheses (e.g. model parameter hypotheses) and the sensor signal hypotheses (for example by means of an operation command creator of the server device).

In one further embodiment variant, the plurality of system state hypotheses, operation command hypotheses and/or sensor signal hypotheses are created in parallel. The high computing power available of the server device can thereby advantageously be used in order to support the real-time capability of the operation of the client device.

In one exemplary embodiment, the method includes creating a plurality of further system state hypotheses with respect to predictive system states of the client device, which are further in the future than the system state hypotheses, based on the status image of the client device, the system state hypotheses and preferably an environmental model of the client device (for example by means of a hypotheses creator of the server device). The method can further include creating a plurality of further predictions, which each have at least one sensor signal hypothesis (for example created by means of a hypotheses creator and/or a simulation environment of the server device) and at least one operation command hypothesis (for example created by means of an operation command creator of the server device), based on the plurality of further system state hypotheses. The method can further include sending the plurality of further predictions to the client device, preferably together with the plurality of predictions (for example by means of a communication device of the server device). In this way, predictions for a plurality of time steps can advantageously be created in advance and sent to the client device.

In one embodiment, the method for operating the client device or the method for operating the server device is repeated cyclically, preferably according to an operating cycle of the client device.

The method can preferably further include receiving a model correction from the client device (for example by means of a communication interface of the server device). The status image can preferably be updated depending on the received model correction (for example by means of a status modeller of the server device).

One further aspect of the present disclosure relates to a device, preferably a client device (e.g. a transport system, robot, vehicle or terminal) or server device (e.g. a local server device, edge server device or cloud server device), which is preferably configured to perform a method as disclosed herein.

The client device can preferably have an internal sensor system, an environment sensing system, a user input device, a communication interface, a planner, a hypothesis allocator, an actuator system and/or a user output device.

The server device can preferably have a communication interface, a status modeller, an environment modeller, a hypothesis creator, a simulation environment, a post-processor and/or an operation command creator.

According to one further aspect, the present disclosure relates to a method for operating a network with a client device and a server device. The method for operating the network can include the method steps of the method disclosed herein for operating a client device and/or the method steps disclosed herein for operating a server device.

According to one further aspect, the present disclosure relates to a computer program product which has program code areas for performing a method as disclosed herein if the computer program product is executed on one or a plurality of computers.

It is possible for the computer program product to be stored on a computer-readable medium.

The preferred embodiments and features of the invention which were described previously can be combined with one another as desired.

BRIEF DESCRIPTION OF THE FIGURES

Further details and advantages of the invention are described hereinafter relating to the accompanying drawings. In the drawings.

DETAILED DESCRIPTION

Figure 1:
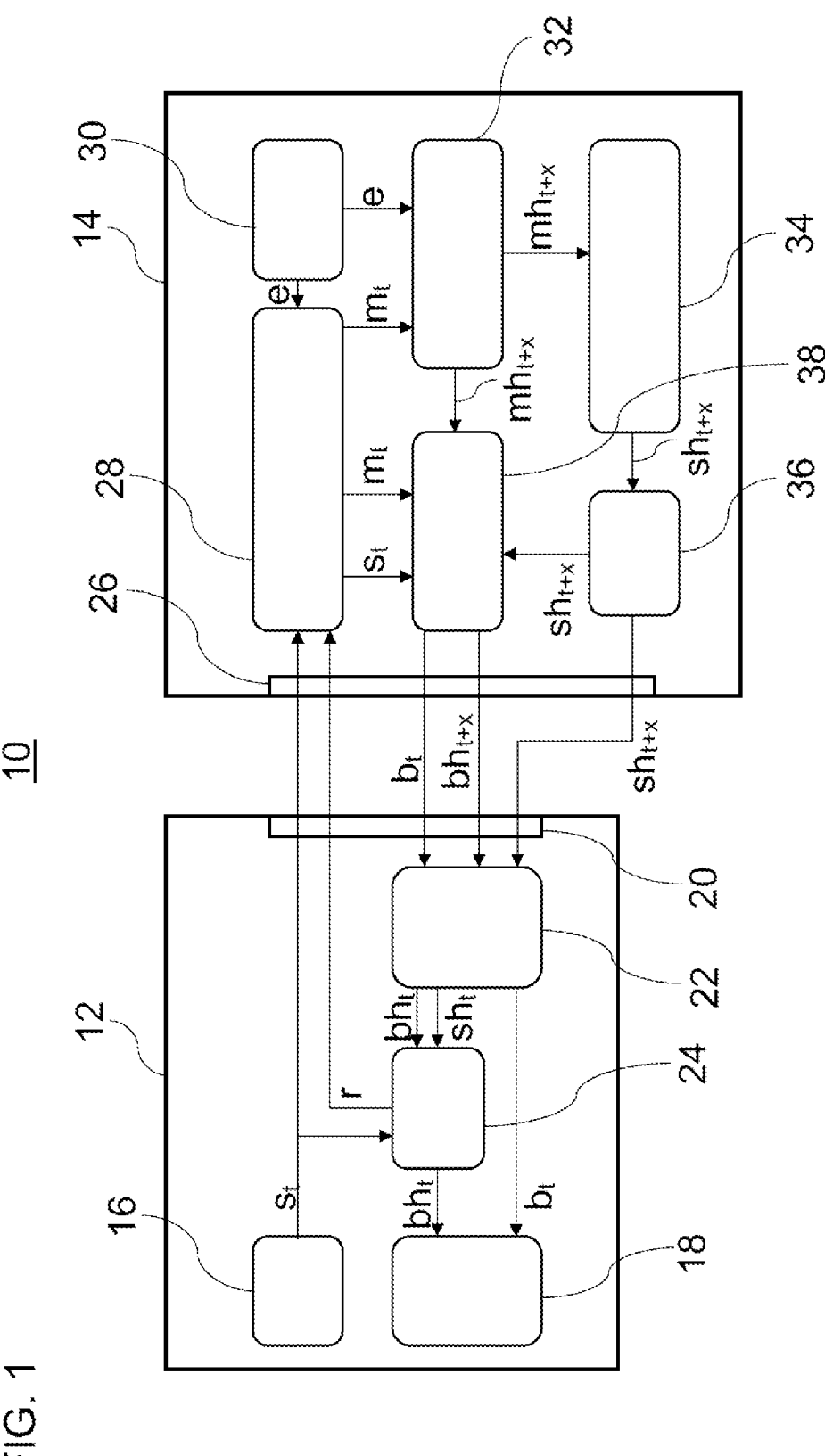
FIG. 1 shows a schematic representation of a network system according to one exemplary embodiment of the present disclosure.

FIG. 1 shows a network system 10. The network system 10 has a client device 12 and a server device 14. The client device 12 and the server device 14 can communicate with one another, for example wired or wirelessly.

The client device 12 is mobile or stationary and can be designed for indoor and/or outdoor applications, for example. The client device 12 can be any type of device in which outsourcing of computing power to the server device 14 is possible. In this case, computationally intensive problems are preferably outsourced to the server device 14. The client device 12 can therefore be any type of machine, vehicle or terminal, for example. The client device 12 is particularly preferably designed as a transport system or a robot, for example as an automated guided vehicle (AGV) for material transport. It is also possible for the client device 12 to be designed, for example, as an automated motor vehicle or a (user) terminal (e.g. AR/VR smart glasses, desktop PC, smartphone, tablet, laptop, terminal, etc.).

The server device 14 can be any type of device to which computing power can be outsourced from the client device 12. The server device 14 can be a cloud server device, an edge server device or any other server device in a network, for example. The server device 14 can preferably be implemented in a so called cloud computing infrastructure.

The client device 12 has at least one device 16 for detecting a current sensor signal and at least one device 18 for performing an operation command.

The device 16 can detect and output current sensor signals from one or a plurality of sources. FIG. 1 shows the output of a current sensor signal schematically with the reference symbol s_t, wherein t can stand for a point in time, a time period, a time step or an operating cycle of the client device 12, for example, as with all other parameters specified herein. For the sake of simplicity, only time steps t will be mentioned hereinafter. The sensor signals can be suitably detected by the device 16 at a high rate, for example in the double digit ms range.

The device 16 can be designed as an environment sensing system and/or internal sensor system of the client device 12, for example. The sensor system can detect the sensor signal in a contactless or contacting manner. The sensor system can have a radar, a laser scanner (Lidar), an ultrasonic sensor, a speed sensor, an acceleration sensor, a path sensor, an angle sensor, a position sensor (or positioning system—e.g. GPS), a thermometer, a hygrometer, a manometer and/or a microphone, for example. It is also possible for the device 16 to have a user input device with which user inputs can be detected in the form of sensor signals. The user input device can detect user inputs visually, acoustically or haptically. The user input device can have a camera, a switch, a keyboard, a mouse, a button, a controller, a touch-sensitive display, a microphone and/or any other operating device, for example.

The device 18 can perform received operation commands for operating the client device 12. FIG. 1 schematically represents that the device 18 can receive an operation command (characterised as b_t in FIG. 1) or an operation command hypothesis (characterised as bh_t in FIG. 1). Depending on the reception, the device 18 can perform the operation command b_t or the operation command hypothesis bh_t. Operation of the client device 12 can therefore be correspondingly adapted to the operation command b_t or the operation command hypothesis bh_t.

The device 18 can, for example, have at least one actuator, for example a steering actuator, drive, valve, etc. It is also possible for the device 18 to have a user output device with which information can be output to a user. The user output device can output information visually, acoustically and/or haptically. The user output device can have a display, a loudspeaker, a signal generator, etc., for example.

The client device 12 further has a communication interface 20, a planner or scheduler 22 and a hypothesis allocator or hypothesis matcher 24. The planner 22 and the hypothesis allocator 24 are preferably designed as functional units of a software program.

The client device 12 can communicate with the server device 14 by means of the communication interface 20. The communication interface 20 can communicate wirelessly or in a wired manner with the server device 14, for example. The wireless communication can preferably take place via a 4G wireless network, a 5G wireless network or WLAN. The wired communication can be implemented via a BUS system or Ethernet, for example.

The communication interface 20 can send sensor signals s_t, which have been detected by the device 16, to the server device 14, for example. The communication interface 20 can also send model corrections r from the hypothesis allocator 24 to the server device 14.

Operation commands b_t, operation command hypotheses bh_t+x (for x time steps after the time step t) and sensor signal hypotheses sh_t+x (for x time steps after the time step t) can be received by means of the communication interface 20.

The operation command hypotheses bh_t+x and sensor signal hypotheses sh_t+x are grouped into predictions. Each prediction has at least one sensor signal hypothesis sh_t+x and at least one operation command hypothesis bh_t+x. The sensor signal hypotheses sh_t+x of different predictions differ from one another. The operation command hypothesis bh_t+x of different predictions can differ from one another or can be the same. The communication interface 20 can receive predictions for only one future time step (t+1) or for a plurality of future time steps (t+1, t+2 and more if applicable) from the server device 14.

The operation commands b_t, operation command hypotheses bh_t+x and/or sensor signal hypotheses sh_t+x can be sent and received in separate messages or joint messages. The communication interface 20 can supply the received operation commands b_t, operation command hypotheses bh_t+x and sensor signal hypotheses sh_t+x to the planner 22.

The planner 22 checks whether or not an operation command b_t has been received for the next time step t. If an operation command b_t has been received in time, it can be transmitted to the device 18. In the case of sufficient latencies and suitable response time, the operation commands b_t generated externally from the client device 12 can thus be transmitted to the device 18 (e.g. the actuator system) in the appropriate cycle or time step.

Conversely, if an operation command has not been received by the planner 22 within a predetermined period of time (for example as a result of package losses or increased latencies), the planner 22 can supply operation command hypotheses and sensor signal hypotheses bh_t and sh_t already received previously for the next time step to the hypotheses allocator 24. The predictions generated externally from the client device 12 for the next time step can thus be supplied to the hypothesis allocator 24 in the form of (synthetic) sensor values (=sensor signal hypotheses sh_t) and corresponding actions (=operation command hypotheses bh_t). For this purpose, the planner 22 manages the predictions received previously from the server device 14 for preferably a plurality of time steps in advance, i.e. operation command hypotheses and sensor signal hypotheses bh_t and sh_t.

The planner 22 can also separate out operation commands b_t, operation command hypotheses bh_t+x and sensor signal hypotheses sh_t+x which are not received in time and/or are not fully received.

The hypothesis allocator 24 can receive the operation command hypotheses and sensor signal hypotheses bh_t and sh_t from the planner 22, i.e. the plurality of predictions for the time step t. In addition, the hypothesis allocator 24 can receive the sensor signals s_t. The hypothesis allocator 24 can compare the sensor signal hypotheses sh_t with the sensor signals s_t. The hypothesis allocator selects that sensor signal hypothesis sh_t which most closely approximates the sensor signal s_t or even corresponds to it. In other words, a matching takes place between the plurality of sensor signal hypotheses sh_t and the sensor signal s_t.

The selection of that sensor signal hypothesis sh_t which most closely approximates the sensor signal s_t is suitably adapted to the respective type of sensor signal s_t. If the sensor signal s_t (as well as the sensor signal hypothesis) is, for example, only a simple numerical value (e.g. a pressure value, temperature value, speed value, distance value, acceleration value, position value, etc.), that sensor signal hypothesis sh_t can therefore preferably be selected which has the smallest difference to the sensor signal s_t. If, for example, the sensor signal consists of a key combination (e.g. arrow key left), that sensor signal hypothesis sh_t can therefore preferably be selected which is identical to this key combination or at least substantially corresponds to it. If the sensor signal consists of more complex information, for example image data or point clouds, correspondingly adapted algorithms (e.g. nearest neighbour heuristic, threshold value comparison) can be used by the hypothesis allocator 24 for selecting the most closely approximating sensor signal hypothesis sh_t. In the case of image data, it is possible to also use a pixel comparison between the plurality of sensor signal hypotheses sh_t and the sensor signal, for example. The respective variants can also be subtracted from one another. In general, an alignment of the current sensor signal value s_t with the sensor signal hypotheses sh_t is carried out on the client device 12 in a manner which is as simple as possible. It should be possible to carry out this alignment with minimal computing power in order to be able to achieve a target cycle time if applicable.

The sensor hypothesis selected from the plurality of sensor signal hypotheses s_t is part of a prediction which also has at least one operation command hypothesis bh_t. The hypothesis allocator 24 supplies the at least one operation command hypothesis bh_t, which is allocated to the selected sensor signal hypothesis sh_t, (or the selected prediction) to the device 18.

It is possible for the client device 12 to detect sensor signals s_t from a plurality of sources and supply them to the hypothesis allocator 24. The predictions received by the hypothesis allocator 24 could in each case have a sensor signal hypothesis sh_t for one or a plurality of the sources.

It is also possible for the client device 12 to not select any of the sensor signal hypotheses sh_t because none of the sensor hypothesis sh_t comes close enough to the sensor signal s_t. For such a test, corresponding threshold values or limit values can be stored in the hypothesis allocator 24, for example. In such a case, a predefinable emergency operation command can be sent to the device 18, for example, which slows down, transfers into a safe state or shuts down the device 18 or the client device 12, for example. In particular in the case of mobile robots, vehicles and transport systems as client devices 12, the driving behaviour can be adapted correspondingly (for example reducing the speed).

It is also possible for the hypothesis allocator 24 to create a model correction r which is based on the selected prediction and preferably on the difference between the selected sensor signal hypothesis sh_t and the sensor signal s_t. The model correction r can be sent to the server device 14 by means of the communication interface 20. The model correction r can be used by the server device 14 to update a status image or state image of the client device 12, for example.

The server device 14 has a communication interface 26, a status modeller 28, a hypothesis creator 32 and an operation command creator 38. The server device 14 can further have an environment modeller 30, a simulation environment 34 and/or a post-processor 36, for example. The status modeller 28, the hypothesis creator 32, the simulation environment 34, the operation command creator 38, the environment modeller 30 and/or the post-processor 36 are preferably designed as functional units of a software program.

The communication interface 26 can receive the sensor signals s_t and optionally the model corrections r. The received sensor signals s_t and model corrections r can be supplied to the status modeller 28. The communication interface 26 can additionally send operation commands b_t and a plurality of predictions, which each have at least one sensor signal hypothesis sh_t+x as well as at least one operation command hypothesis bh_t+x, to the client device 12.

It is possible for the server device 14 to have a so called quality gate, in order to separate out sensor signals which are not received in time.

The status modeller 28 has a data-driven image or status model of the client device 12. Provided that the client device 12 interacts with an environment, a data-driven environmental model e can additionally also be included here. The status model can be updated based on the received sensor signals s_t and optionally the environmental model e and/or the model correction r. This means that a current status or state of the client device 12 can always be modelled, for example. For each time step t, the status modeller 28 can output relevant model parameters m_t to the operation command creator 38 and the hypothesis creator 32. The model parameters m_t can be derived from the status model taking into account the sensor signals s_t and optionally the environmental model, for example via maps, tables, allocations, algorithms, etc. The model parameters m_t are selected depending on the client device 12. In addition, the sensor signals s_t can be output to the operation command creator 38.

The environment modeller 30 can have a data-driven image of the environment of the client device 12 and output it as an environmental model e. It is possible for the environmental model e to be fixedly predefined and unchangeable, for example map data. It is also possible for the environment modeller 30 to adapt the environmental model e, for example in response to an interaction between the client device 12 on the actual environment (e.g. a construction machine, manufacturing machine). Changes to the environmental model e can be adapted by means of information which is derived from the sensor signals s_t, for example.

It is possible that the environmental model e is created by means of machine learning only during use of the client device 12 (e.g. SLAM), is updated or optimised during operation, for example by means of sensor signals from the client device 12. It is also possible that the environmental model e (based on experience where applicable) can take into account or predict a spontaneous appearance of non-mapped obstacles in the case of autonomous navigation.

The hypothesis creator 32 receives the model parameters m_t as well as optionally the environmental model e. The hypothesis creator 32 therefore presents a sufficiently accurate estimate of the current system state of the client device 12 (in the case of mobile robots, for example, the position of the robot on a global map, identified obstacles, etc.). The hypothesis creator 32 only creates predictions or hypotheses about likely future system states of the client device 12 which each have corresponding model parameter hypotheses mh_t+x. The hypotheses thus include data on possible, preferably likely, states of the client device 12 in the future. The hypothesis creator can use look-up tables (conversion tables) for creating the system state hypotheses, for example.

For at least one future time step t+1, but preferably a plurality of future time steps t+x, the hypothesis creator 32 in each case creates in parallel a plurality of hypotheses with associated model parameter hypotheses mh_t+x for future system states of the client device 12. In this case, empirical, statistical or artificial intelligence methods or models can be used, for example. In principle, the hypothesis creation can take place in a rule-based, experience-based, model-based, random manner or as a combination of at least some of the aforementioned possibilities. Interpolations and/or extrapolations may also be suitably made. The methods or models are preferably also used in order to limit the space of the hypothesis generation, to obtain more accurate estimations regarding future states and thus to significantly reduce the number of hypotheses which are to be generated. The selection of the time steps can here correspond to an operating cycle frequency of the client device 12 and/or can suitably extend a plurality of dependent cycle steps into the future (for example represented by (e.g. weighted) graphs or decision trees), for example.

The obtained hypotheses are in turn characterised by the model parameter hypotheses mh_t+x relevant in each case (e.g. position, speed, possible interferences). The model parameter hypotheses mh_t+x can also be abstract. The created model parameter hypotheses mh_t+x can be transmitted to the operation command creator 38.

It is possible for the system state hypotheses, amongst other things, to be created based on machine learning. For example, the environment and probabilities for specific processes can be learned in practical use, for example via neural networks. An initial model can be refined or adapted by empirical data at runtime if applicable.

In addition, a so called LSTM technique (long short-term memory) can be applied when adapting the AI model/ machine learning, for example. The AI model can be adapted during operation based on empirical data/circumstances of the environment. In the practice of the respective application, the AI model can learn which hypothetical states are more likely based on the current status. Inherent knowledge of the environment therefore makes it possible to generate more targeted (based on experience), more appropriate or more accurate hypotheses.

It is also possible for a so called digital twin to be used for the (model-based) creation of the hypotheses. The digital twin can include a (real-time) image of the environment, for example. In the case of a mobile transport system (e.g. an AGV), the digital twin can have a real-time image of the environment optionally with the position and/or route of at least one further mobile transport system and/or the position and/or movement of other objects, for example. The corresponding information on which the digital twin is based can be obtained by receiving other (e.g. static) camera or sensor information with respect to the environment, for example. The information can additionally or alternatively also be received from a (e.g. fleet) management system, for example. In this case, the use of the digital twin can facilitate generating even more accurate hypotheses in particular with respect to potential collision objects.

The sensor signal hypotheses sh_t+x can be derived or estimated from the hypothesis creator 32 optionally directly from the model parameter hypotheses mh_t+x and/or the associated, predicted status images. This may be suitably possible if the sensor signals s_t or the sensor signal hypotheses sh_t are not very complex, for example simple numerical values or odometry data. The hypothesis creator 32 can supply the created sensor signal hypotheses sh_t+x (together with the created model parameter hypotheses mh_t+x) to the operation command creator 38 (not represented in FIG. 1).

Conversely, in the case of more complex sensor signals, for example in the case of optical sensor systems, it can be advantageous to supply the model parameter hypotheses mh_t+x to the simulation environment 34 for creating the sensor signal hypotheses sh_t+x. The simulation environment 34 can use different instances (for example on different virtual machines) in order to determine the sensor signal hypotheses sh_t+x through virtual sensors. This can be carried out very efficiently in parallel for a large number of possible states in the sense of cloud computing by means of the server device 14. The result is formed by synthetic 2D or 3D image data, point clouds or distributions in general, for example.

The simulation environment 34 can be implemented as a graphical simulation environment, for example. The simulation environment 34 can graphically map future system states based on the model parameter hypotheses mh_t+x and optionally the environmental model. The sensor signal hypotheses sh_t+x can be derived from the simulation environment 34 via simulated or virtual sensor systems. The sensor signal hypotheses sh_t+x thus represent artificially or synthetically generated sensor signals. On this basis, simulated sensors are used, which supplement the hypothesis with the respective sensor values. This makes it possible to generate synthetic laser/lidar and camera images in 2D and 3D, for example.

In order to promote a minimum alignment between the sensor signal hypotheses sh_t(+x) and the sensor signals s_t, it can additionally be advantageous to post-process the sensor signal hypotheses sh_t+x by means of the post-processor 36, preferably to make it more realistic.

In order to increase the realism of the sensor signal hypotheses sh_t+x, the post-processor 36 may perform various specific post-processing steps on the sensor signal hypotheses sh_t+x, if desired. The post-processor 36 can, for example, add disturbance variables, such as noise, or perform a realistic rendering of image data. The post-processor can also use AI-based methods for generating sensor data which is as real as possible from synthetic data. For example, the post-processor 36 can use so called generative adversarial networks (GANs) for this purpose.

The operation command creator 38 can receive the model parameters m_t and the associated sensor signals s_t as well as the model parameter hypotheses mh_t+x and the associated sensor signal hypotheses sh_t+x. The operation command creator 38 can, on the one hand, create operation commands b_t from the model parameters m_t and the associated sensor signals s_t via planning/control and/or regulatory functions. The operation command creator 38 can also create a plurality of operation command hypotheses bh_t+x from the model parameter hypotheses mh_t+x and the associated sensor signal hypotheses sh_t+x. This results in a plurality of predictions for each future time step t considered. In this case, each prediction can have at least one sensor signal hypothesis sh_t+x (for example depending on a sensor number of the device 16) and at least one operation command hypothesis bh_t+x (for example depending on an actuator number of the device 18). The plurality of predictions (sh_t+x and bh_t+x) and the operation commands b_t can be sent to the client device 12 by means of the communication interface 26.

It is possible that the sensor signal hypotheses sh_t+x are compressed or coded prior to transmission by means of the communication interface 26. The compressed sensor signal hypotheses sh_t+x can be decompressed after being received by means of the communication interface 20. This can be particularly advantageous if the sensor signal hypotheses sh_t+x have image data and/or lots of sensor signal hypotheses sh_t+x are being transmitted and/or only limited bandwidth is available for transmission. For example, only reduced differential signals and/or commands can be transmitted. In this case, standard methods for sensor data compression or coding can also be used.

It is also possible for the hypothesis allocation (by means of the hypothesis allocator 24) to be carried out directly by means of the compressed or coded sensor signal hypotheses sh_t+x. This may possibly also make the generation of the hypotheses more efficient, such that less computing time is required on the side of the server device 14.

In order to improve understanding, a method for operating the client device 12 (see FIG. 2) and the server device 14 (see FIG. 3) is described hereinafter with reference to all of the figures. For the sake of simplicity, the explanation is made for one example in which the device 16 only has one sensor and the device 18 only one actuator. It is understood that the underlying teaching may also be applied in the case of a client device 12 with a plurality of sensors and/or a plurality of actuators. Even if the individual method steps are represented in a sequential manner, it is possible to carry out some method steps in parallel in order to save time, for example.

Figure 2:
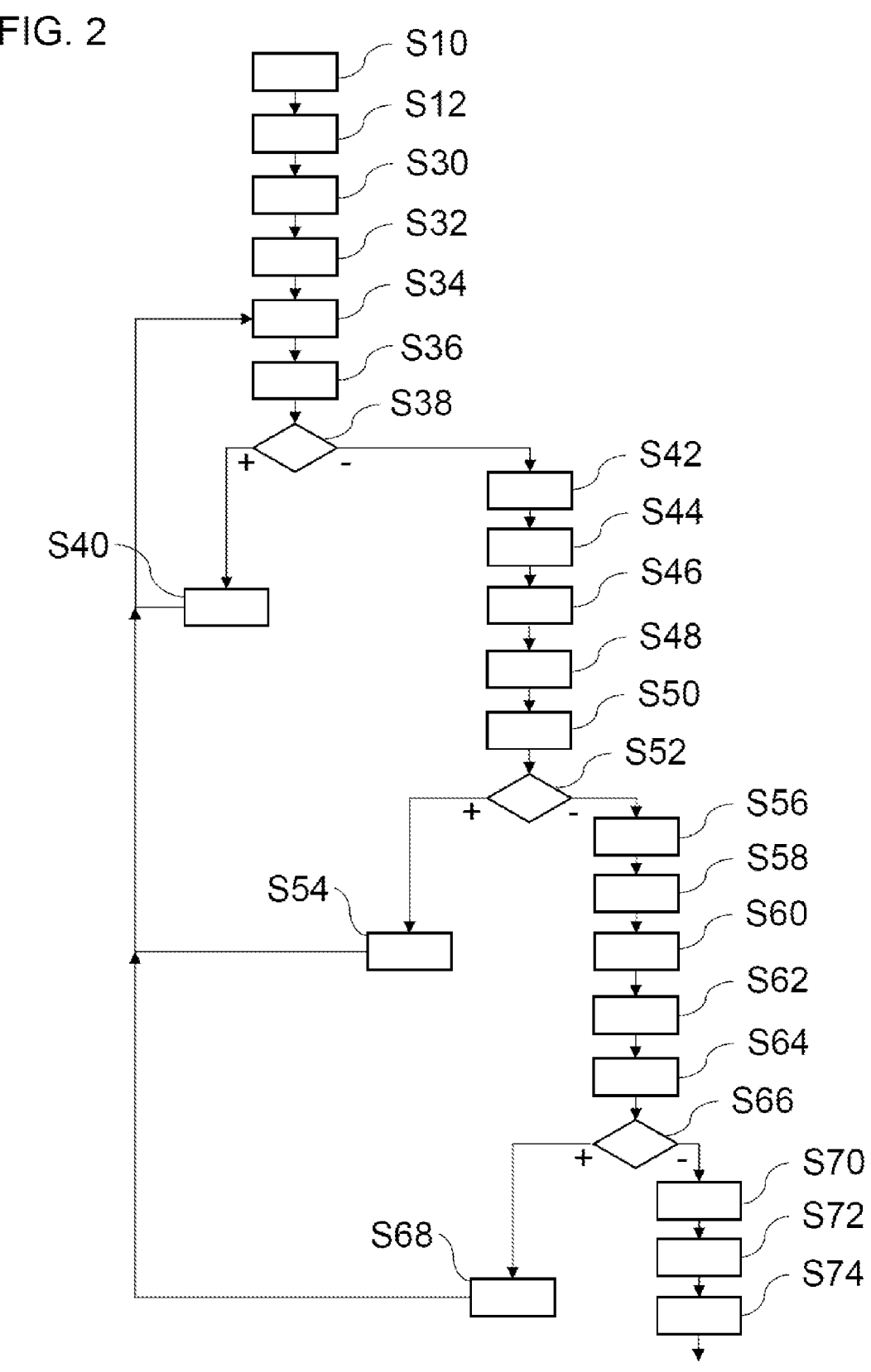
FIG. 2 shows a flow diagram of a method for operating a client device according to one exemplary embodiment of the present disclosure.

FIG. 2 firstly shows the method steps S10 and S12. In step S10, the device 16 can detect a current sensor signal, for example an initial sensor signal for an initial time step (e.g. t=0). In step S12, the communication interface 20 can send the initial sensor signal to the communication interface 26 of the server device 14.

Figure 3:
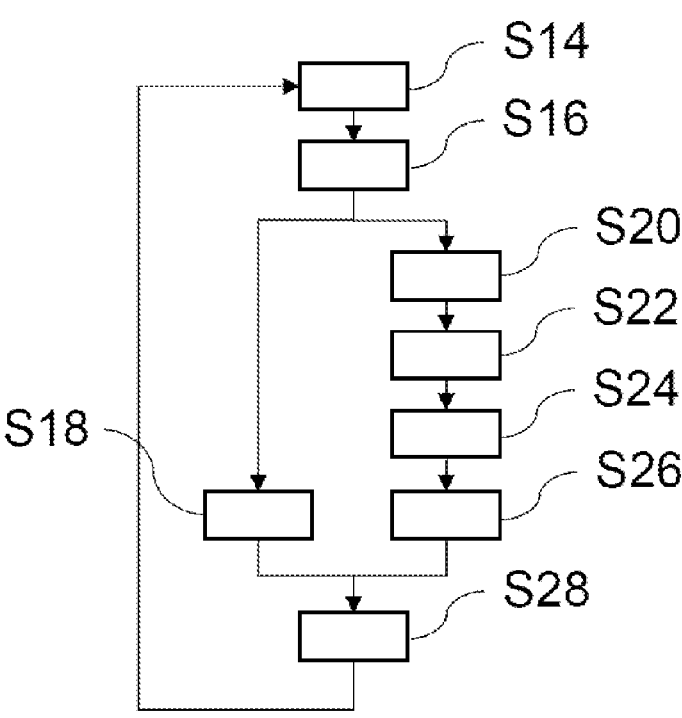
FIG. 3 shows a flow diagram of a method for operating a server device according to one exemplary embodiment of the present disclosure.

FIG. 3 shows a response of the server device 14 to the initial sensor signal.

In a step S14, the initial sensor signal is received from the client device 12 by means of the communication interface 26. In a step S16, the status modeller 28 creates one or a plurality of initial model parameters. The initial model parameters are supplied to the operation command creator 38. In addition, the initial sensor signal is supplied to the operation command creator 38.

In a step S18, the operation command creator 38 creates an initial operation command for the device 18 from the at least one initial model parameter and the sensor signal. The steps S20, S22, S24 and/or S26 can be performed in parallel to this.

In step S20, the hypothesis creator 32 creates a plurality of system state hypotheses for possible future states of the client device 12 for a plurality of future time steps, for example 2, 3 or more time steps. Model parameter hypotheses are therefore also available in each case for the plurality of system state hypotheses. In step S22, sensor signal hypotheses are created, for example by the hypothesis creator 32 or the simulation environment 34. A plurality of sensor signal hypotheses are created for each future time step considered. In step S24, the sensor signal hypotheses can be adapted by means of the post-processor 36, if desired and available. In step S26, the operation command creator 38 creates a plurality of operation command hypotheses for the device 18, namely for each future time step considered a plurality of operation command hypotheses in each case, from the model parameter hypotheses and the sensor signal hypotheses. Each of the operation command hypotheses and one each of the sensor signal hypotheses forms a prediction. The allocation takes place in such a way that the respective operation command hypothesis is allocated to that sensor hypothesis from which it is derived. The operation hypothesis and the sensor hypothesis of the same prediction are based on the same model parameter hypothesis/hypotheses.

It is also possible that an initialisation of the hypothesis creator 32 is not firstly carried out upon receiving the initial sensor signal but rather on the basis of base values or empirical values, etc., for example.

In step S28, the communication interface sends the initial predications and the initial operation command to the client device 12. The server device 14 continues to "listen" for new sensor signals and optionally model corrections in step S14.

Referring again to FIG. 2, the communication interface 20 receives the initial operation command and the predictions from the server device 14 in a step S30. In a step S32, the planner 22 identifies that the initial operation command has been received in time and supplies it to the device 18 at a desired point in time. The device 18 is operated corresponding to the initial operation command.

In a step S34, a first, now current, sensor signal is detected by the device 16 for a first time step t=1. In step S36, the communication interface 20 can send the first sensor signal to the communication interface 26 of the server device 14. As already explained accordingly for the initial sensor signal, the server device 14 can receive the first sensor signal and, in response to this, send a first operation command and a plurality of first predictions.

In a step S38, it is checked whether (+) or not (−) the first operation command (and the plurality of first predictions) have been received by the communication interface 20 or the planner 22 within a predetermined period of time. For example, the first operation command could be received too late as a result of excessive latencies or only be received incompletely as a result of package losses.

If it is determined in step S38 that the first operation command has been received in time (+), the planner 22 supplies it to the device 18 at a desired point in time. The device 18 is operated corresponding to the first operation command in step S40. The method can be further continued with step S34 with a detection of a second sensor signal for a second time step (t=2). Provided that a second operation command for the second time step (t=2) is not subsequently received in time from the server device 14, it is possible to proceed in accordance with the subsequently described steps S42ff, wherein the first predictions can now be used instead of the initial predictions.

If it is determined in step S38 that the first operation command has not been received within the predetermined period of time (−), the planner 22 transmits the initial predictions for the first time step to the hypothesis allocator 24 in step S42. In step S42, the hypothesis allocator 24 selects that initial prediction for the first time step whose sensor signal hypothesis has the smallest difference to the first sensor signal. It is also possible that a more current sensor signal is available in the meantime with which the comparison can additionally or alternatively be carried out. In step S44, the corresponding model correction is sent to the server device 14. In step S46, the operation command hypothesis of the selected initial prediction for the first time step is supplied to the device 18 and the device 18 is operated corresponding to the operation command hypothesis.

In a step S48, a second, now current, sensor signal is detected by the device 16 for the second time step t=2. In step S50, the communication interface 20 can send the second sensor signal to the communication interface 26 of the server device 14. As already explained accordingly for the initial sensor signal, the server device 14 can receive the second sensor signal and, in response to this, send a second operation command and a plurality of second predictions.

In a step S52, it is checked whether (+) or not (−) the second operation command (and the plurality of second predictions) have been received by the communication interface 20 or the planner 22 within a predetermined period of time.

If it is determined in step S52 that the second operation command has been received in time (+), the planner 22 supplies it to the device 18 at a desired point in time. The device 18 is operated corresponding to the second operation command in step S54. The method can be further continued with step S34 with a detection of a third sensor signal for a third time step (t=3). Provided that a third operation command for the third time step is not subsequently received in time from the server device 14, it is possible to proceed in accordance with the described steps S42ff, wherein the second predictions can now be used instead of the initial predictions.

If it is determined in step S52 that the second operation command has not been received within the predetermined period of time (−), the planner 22 transmits the initial predictions for the second time step to the hypothesis allocator 24 in step S56. In step S56, the hypothesis allocator 24 selects that initial prediction for the second time step whose sensor signal hypothesis has the smallest difference to the second sensor signal (and/or a more current sensor signal). In step S58, the corresponding model correction is sent to the server device 14. In step S60, the operation command hypothesis of the selected initial prediction for the second time step is supplied to the device 18 and the device 18 is operated corresponding to the operation command hypothesis.

In a step S62, a third, now current, sensor signal is detected by the device 16 for a third time step t=3. In step S64, the communication interface 20 can send the third sensor signal to the communication interface 26 of the server device 14. As already explained accordingly for the initial sensor signal, the server device 14 can receive the third sensor signal and, in response to this, send a third operation command and a plurality of third predictions.

In a step S66, it is check whether (+) or not (−) the third operation command (and the plurality of third predictions) have been received by the communication interface 20 or the planner 22 within a predetermined period of time.

If it is determined in step S66 that the third operation command has been received in time (+), the planner 22 supplies it to the device 18 at a desired point in time. The device 18 is operated corresponding to the third operation command in step S68. The method can be further continued with step S34 with a detection of a fourth sensor signal for a fourth time step (t=4). Provided that a fourth operation command for the fourth time step is not subsequently received in time from the server device 14, it is possible to proceed in accordance with the described steps S42ff, wherein the third predictions can now be used instead of the initial predictions.

If it is determined in step S66 that the third operation command has not been received within the predetermined period of time (−), the planner 22 transmits the initial predictions for the third time step to the hypothesis allocator 24 in step S70. In step S770, the hypothesis allocator 24 selects that initial prediction for the third time step whose sensor signal hypothesis has the smallest difference to the third sensor signal (or a more current sensor signal). In step S72, the corresponding model correction is sent to the server device 14. In step S74, the operation command hypothesis of the selected initial prediction for the third time step is supplied to the device 18 and the device 18 is operated corresponding to the operation command hypothesis.

The method may proceed accordingly, wherein operation command hypotheses can only be selected as long as the initial predictions have further time steps (t=4, t=5 etc.). If there are no more predictions available for a corresponding time step, it is possible to use the described emergency operation command, for example.

The method can be performed with a client device 12 which is designed as an automated guided vehicle (AGV), for example. The device 16 of the transport vehicle has a laser scanner for detecting the environment. Alternatively or additionally, the device 16 can have a camera and/or a radar, for example. The device 18 of the transport vehicle has a steering actuator and a drive (e.g. an internal combustion engine or electric motor). In step S10, the laser scanner detects an environment of the transport vehicle as an initial sensor signal (e.g. as a point cloud) which is sent to the server device 14 in step S12. In step S14, the initial sensor signal of the laser scanner is received by the server device 14. In step S16, a status image of the transport vehicle is updated. Based on a map of the environment (environmental model e) and the initial sensor signal, a position of the transport vehicle, a speed of the transport vehicle, a direction of movement of the transport vehicle and/or obstacles in the path of the transport vehicle can be determined, for example. These model parameters are supplied to the operation command creator 38 and the hypothesis creator 32. In step S20, the hypothesis creator creates a plurality of system state hypotheses for possible future system states for a plurality of future time steps. In this case, known obstacles which are in the direction of movement of the transport vehicle and/or a known navigation route of the transport vehicle can be taken into account according to the environmental model e, for example. At least one associated model parameter hypothesis can be derived from the system state hypotheses in each case (for example the position of the transport vehicle, speed of the transport vehicle, direction of movement of the transport vehicle and/or obstacles in the path of the transport vehicle). In step S22, sensor signal hypotheses in the form of point clouds are derived from the model parameter hypotheses by means of the simulation environment. The point clouds can already have a high level of realism as synthetic sensor signals, so that a post-processor is not necessary. In steps S18 and S26, the operation commands for the steering actuator and the drive of the transport vehicle are created with respect to the initial sensor signal and the model parameters, and the plurality of operation command hypotheses for the steering actuator and the drive of the transport vehicle with respect to the plurality of sensor signal hypotheses and model parameter hypotheses. The information is sent together to the transport vehicle in step S28, for example. The transport vehicle receives the information in step S30. In step S32, the steering actuator and the drive of the transport vehicle are operated corresponding to the received operation commands. In step S34, the laser scanner detects the environment again. The sensor signal is sent to the server device in step S36. If operation commands for the steering actuator and the drive for the next time step are not received in time by the transport vehicle in step S38, it is possible for it to fall back on the predictions already received.

The method can also be applied in user interaction processes, for example, preferably in the context of cloud computing, for example cloud gaming. For example, the client device can be a terminal, such as a PC, a console, a tablet, etc., for example. The device 16 can have a user input device, for example buttons or a touch-sensitive display. The device 18 can have a display. The sensor signals are brought about by user inputs by means of the device 16. Inputs of the user can be anticipated or predicted in the predictions (=sensor signal hypotheses). The operation commands and operation command hypotheses can have image data for displaying on the display of the device 18 and/or audio data for outputting by means of a loudspeaker of the device 18.

The invention is not limited to the preferred exemplary embodiments described above. In fact, a multiplicity of variations and modifications are possible which also make use of the inventive concept and therefore fall within the scope of protection. In particular, the features of the independent claims are disclosed independently of one another. In addition, the features of the subclaims are also disclosed independently of any features of the independent claims and, for example, independently of the features relating to the presence and/or the configuration of the individual method steps of the independent claims.

LIST OF REFERENCE SYMBOLS

10 network system
12 client device
14 server device
16 device for detecting a sensor signal
18 device for performing an operation command
20 communication interface
22 planner
24 hypothesis allocator
26 communication interface
28 status modeller
30 environment modeller
32 hypothesis creator
34 simulation environment
36 post-processor
38 operation command creator
S10-S74 method steps
b_t operation command(s) for time step t
bh_t operation command hypothesis/es for time step t
bh_t+x operation command hypothesis/es for time step t+x
e environmental model
m_t model parameters for time step t
mh_t+x model parameter hypothesis/es for time step t+x
r model correction
s_t sensor signal(s) for time step t
sh_t sensor signal hypothesis/es for time step t
sh_t+x sensor signal hypothesis/es for time step t+x

What is claimed is:

1. A method for operating a client device for latency compensation, including:

receiving a plurality of predictions, which each have at least one sensor signal hypothesis resulting in a plurality of sensor signal hypotheses and at least one operation command hypothesis resulting in a plurality of operation command hypotheses, from a server device;

detecting at least one first sensor signal;

sending the at least one first sensor signal to the server device;

waiting for a predetermined period of time, wherein upon nonreceipt of a first operation command from the server device within the predetermined period of time in response to sending the at least one first sensor signal:

selecting one of the plurality of predictions depending on at least one of a) the at least one first sensor signal and b) at least one currently detected sensor signal and the plurality of sensor signal hypotheses and wherein the selecting one of the plurality of predictions includes selecting the one of the plurality of predictions corresponding to the at least one sensor signal hypothesis, wherein the at least one sensor signal hypothesis amongst the plurality of sensor signal hypotheses has a smallest difference to the at least one first sensor signal; and operating the client device with the at least one operation command hypothesis of the selected one of the plurality of predictions.

2. The method according to claim 1, further comprising receiving the first operation command from the server device within the predetermined period of time in response to sending the at least one first sensor signal, and operating the client device with the first operation command.

3. The method according to claim 2, wherein:

the at least one first sensor signal is detected by any one of an internal sensor system, an environment sensing system and a user input device of the client device; and at least one of an actuator and a user output device of the client device is operated in accordance with the first operation command.

4. The method according to claim 1, further including:

detecting at least one initial sensor signal before detecting the at least one first sensor signal; and sending the at least one initial sensor signal to the server device, wherein receiving the plurality of predictions takes place in response to sending the at least one initial sensor signal.

5. The method according to claim 4, further including:

receiving at least one initial operation command from the server device in response to sending the at least one initial sensor signal; and operating the client device with the at least one initial operation command until a next operating cycle, until operating the client device with the first operation command or until operating the client device with the at least one operation command hypothesis of the selected one of the plurality of predictions.

6. The method according to claim 1, wherein:

that prediction is selected of which the at least one sensor signal hypothesis one of:

corresponds to the at least one first sensor signal; and differs the least from the at least one first sensor signal.

7. The method according to claim 1, further including:

sending a model correction based on the at least one operation command hypothesis of the selected one of the plurality of predictions to the server device.

8. The method according to claim 1, further including:

receiving a plurality of further predictions, which each have at least one sensor signal hypothesis and at least one operation command hypothesis from the server device;

detecting at least one second sensor signal after detecting the at least one first sensor signal;

sending the at least one second sensor signal to the server device;

waiting for a further predetermined period of time, wherein upon nonreceipt of a second operation command from the server device within the further predetermined period of time in response to sending the at least one second sensor signal:

selecting one of the plurality of further predictions depending on the at least one second sensor signal and/or at least one currently detected sensor signal and the at least one sensor signal hypothesis of the plurality of further predictions; and operating the client device with the at least one operation command hypothesis of the selected one of the plurality of further predictions.

9. The method according to claim 8, further including upon nonreceipt of the second operation command from the server device within the further predetermined period of time in response to sending the at least one second sensor signal, sending a further model correction based on the at least one operation command hypothesis of the selected prediction of the plurality of further predictions to the server device.

10. The method according to claim 8, further including receiving a second operational command from the server device within the further predetermined period of time in response to sending the at least one second sensor signal, and operating the client device with the second operation command.

11. A client device, which is configured to perform the method according to claim 1.

12. The client device of claim 11, wherein the client device is a robot, a vehicle or a terminal.

13. The method according to claim 1, wherein the at least one sensor signal hypothesis includes a simulated sensor output signal from the sensor.

14. The method according to claim 1, wherein the selecting one of the plurality of predictions results in operating the client device with an emergency operation command to transfer into a safe state.

15. A method for operating a server device for latency compensation, including:

creating a plurality of system state hypotheses with respect to predictive system states of a client device, having a sensor, based on one of a status image of the client device and an environmental model of the client device;

creating a plurality of predictions, which each having at least one sensor signal hypothesis resulting in a plurality of sensor signal hypotheses and at least one operation command hypothesis resulting in a plurality of operation command hypotheses, based on the plurality of system state hypotheses;

sending the plurality of predictions to the client device for operating the client device with the at least one operation command hypothesis of a selected one of the plurality of predictions upon nonreceipt of a first operation command from the server device within a predetermined period of time in response to the client device sending at least one initial sensor signal to the server device;

the client device selecting one of the plurality of predictions depending on at least one of a) the at least one initial sensor signal and b) at least one currently detected sensor signal and the plurality of sensor signal hypotheses and wherein the selecting one of the plurality of predictions includes selecting the one of the plurality of predictions corresponding to the at least one sensor signal hypothesis, wherein the at least one sensor signal hypothesis amongst the plurality of sensor signal hypotheses has a smallest difference to the at least one initial sensor signal; and operating the client device with the at least one operation command hypothesis of the selected one of the plurality of predictions.

16. The method according to claim 15, further including receiving the at least one initial sensor signal from the client device, wherein creating one of the status image and the plurality of system state hypotheses is additionally based on the at least one initial sensor signal.

17. The method according to claim 16, further including:

creating at least one initial operation command based on one of the status image and the at least one initial sensor signal; and sending the at least one initial operation command to the client device together with the plurality of predictions.

18. The method according to claim 15, wherein:

one of a) the plurality of sensor signal hypotheses are derived from the plurality of system state hypotheses and an environmental model of the client device, and b) the plurality of sensor signal hypotheses are derived from the plurality of system state hypotheses based on a graphical, simulation environment of the server device;

the plurality of sensor signal hypotheses are adapted or adaptable by adding a disturbance variable of noise, by one of rendering and machine learning, by way of generative adversarial networks; and the plurality of operation command hypotheses are created based on the plurality of system state hypotheses and the plurality of sensor signal hypotheses.

19. The method according to claim 15, wherein:

the plurality of system state hypotheses, operation command hypotheses and sensor signal hypotheses are created in parallel.

20. The method according to claim 15, further including:

creating a plurality of further system state hypotheses with respect to predictive system states of the client device, which are further in the future than the plurality of system state hypotheses, wherein the plurality of further system state hypotheses are based on the status image of the client device, the plurality of system state hypotheses and an environmental model of the client device;

creating a plurality of further predictions, which each have at least one sensor signal hypothesis and at least one operation command hypothesis, based on the plurality of further system state hypotheses; and sending the plurality of further predictions to the client device together with the plurality of predictions.

21. The method according to claim 15, wherein:

the method is repeated cyclically according to an operating cycle of the client device.

22. A server device, which is configured to perform the method according to claim 15.

* * * * *